United States Patent [19]
Takasugi

[11] Patent Number: 5,471,343
[45] Date of Patent: Nov. 28, 1995

[54] IMAGING DEVICE

[75] Inventor: Yoshiharu Takasugi, Iruma, Japan

[73] Assignee: Olympus Optical Co., Ltd., Tokyo, Japan

[21] Appl. No.: 159,615

[22] Filed: Nov. 29, 1993

[30] Foreign Application Priority Data

Nov. 30, 1992 [JP] Japan ................... 4-320208

[51] Int. Cl.$^6$ ............. G02B 5/30; G02B 27/28; G02F 1/23
[52] U.S. Cl. ............ 359/494; 359/497; 359/498; 348/342
[58] Field of Search ................... 359/494, 497, 359/498, 499; 348/342

[56] References Cited

U.S. PATENT DOCUMENTS

| | | | |
|---|---|---|---|
| 4,227,208 | 10/1980 | Takanashi et al. | 359/498 |
| 4,575,193 | 3/1986 | Greivenkamp, Jr. | |
| 4,743,100 | 5/1988 | Nakada et al. | 359/498 |
| 4,761,682 | 8/1988 | Asaida | 359/498 |
| 4,807,981 | 2/1989 | Takizawa et al. | 359/498 |
| 4,988,171 | 1/1991 | Yokota | 359/498 |
| 5,069,530 | 12/1991 | Nishida et al. | 359/498 |

FOREIGN PATENT DOCUMENTS

| | | |
|---|---|---|
| 51-7381 | 3/1976 | Japan . |
| 57-39683 | 3/1982 | Japan . |
| 58-8483 | 2/1983 | Japan . |
| 58-70686 | 4/1983 | Japan . |
| 58-100802 | 6/1983 | Japan . |
| 60-164719 | 8/1985 | Japan . |
| 2250572 | 10/1990 | Japan . |

*Primary Examiner*—Martin Lerner
*Attorney, Agent, or Firm*—Cushman, Darby & Cushman

[57] ABSTRACT

An imaging device has an optical low-pass filter and a solid-state image sensor. The optical low-pass filter includes a plurality of birefringent plates. When a plurality of spaced spots formed by the birefringent plates with respect to incident light are located at adjacent positions such as to be regarded as one spot on the birefringent plates, the birefringent plates are constructed so that a phase difference between light waves passing through the plurality of spaced spots with respect to any wavelength in a visible wavelength region is larger than the wavelength. Thus, the imaging device, even when using many quartz filters, makes the intensities of the spaced spots uniform and can secure the optical low-pass filter free of dependence of wavelength.

15 Claims, 11 Drawing Sheets

FIG. 3
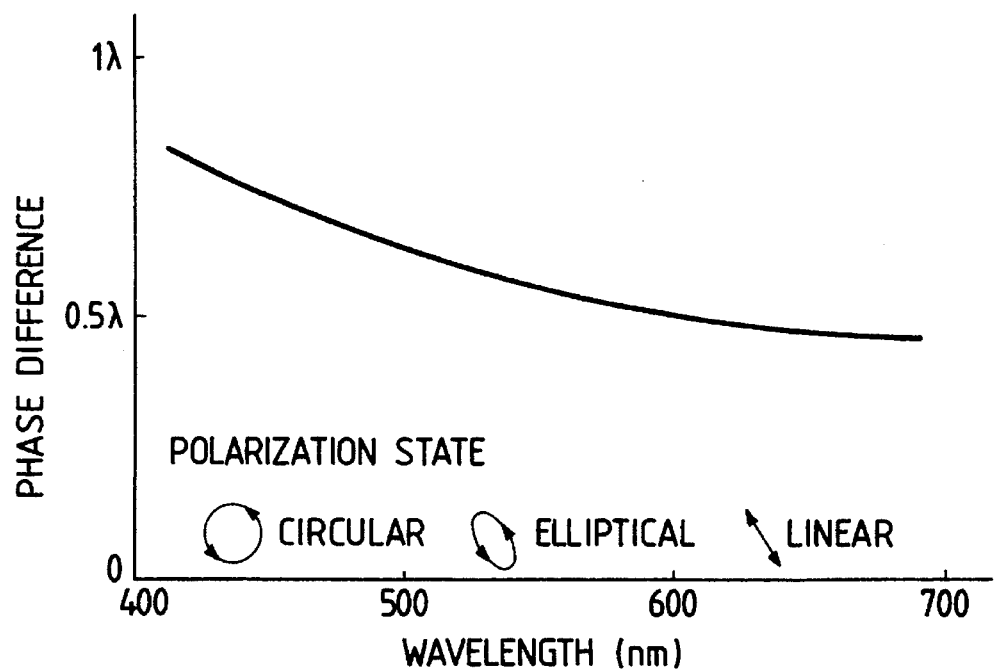
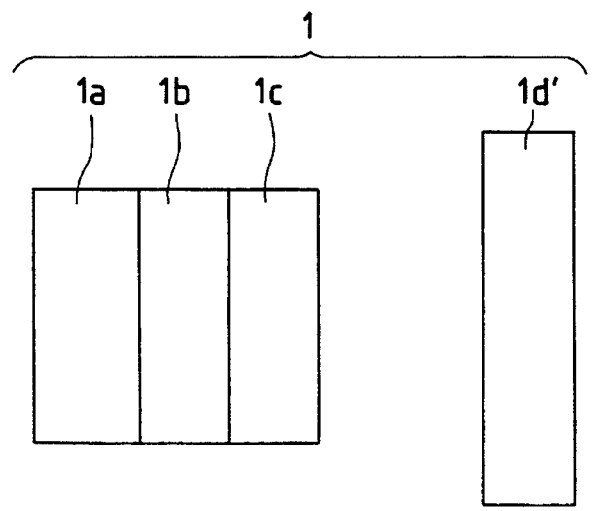
FIG. 4A

IMAGING DEVICE

BACKGROUND OF THE INVENTION

1. Field of the Invention

This invention relates to an imaging device using a solid-state image sensor which can be utilized in the field of medicine or industry.

2. Description of the Related art

Recent advances in semiconductor technology have offered compact design and high performance of a solid-state image sensor such as a CCD. The solid-state image sensor has widespread use in the region of medical apparatus, for example, in such a manner that a compact TV camera housing the CCD is attached to the eyepiece section of an endoscope to diagnose the inward parts of the body through a TV monitor in the TV camera housing the CCD, an optical low-pass filter is in general use for elimination of moire. Such optical low-pass filters, for which birefringent plates are often used, are available as the combination of quartz filters serving as the birefringent plates with other filters, such as polarizing plates, and quartz filters only.

The former optical low-pass filter comprising the combination of quartz filters and other filters is disclosed by Japanese Patent Preliminary Publication Nos. Sho 58-100802 and Sho 58-70686 and Japanese Patent Publication No. Sho 51-7381. These prior art articles employ $\lambda/4$ plates, depolarizing plates, optically active plates, and thin quartz filters, together with quartz filters, in order to equalize the separation intensities of spaced spots where the crystal axes of the quartz filters are oriented at angles other than 45°. In each of such cases, however, numerous members constituting the low-pass filter have caused defects that the structure of the filter is complicated and the whole becomes bulky.

The latter optical low-pass filter comprising quartz filters only, on the other hand, is usually designed so that the crystal axes of plural quartz filters are oriented to shift, 45° for each, and the separation intensities of spaced spots of the quartz filters are nearly equal. In this connection, however, various proposals have been made. For example, as disclosed by Japanese Patent Preliminary Publication No. 57-39683, the orientations of crystal axes of quartz filters are shifted 90° and thereby four spots are formed through separation in a horizontal direction by three quartz filters. Further, as in Japanese Patent Preliminary Publication No. Sho 60-164719, three quartz filters, although oriented at 45°, are used to consciously superpose spaced spots for required low-pass characteristics. In Japanese Patent Preliminary Publication No. Hei 2-250572, four or more quartz filters oriented at 45° are used to superpose spaced spots. These techniques, however, are such that the spaced spots are merely superposed geometrically for combination. Other methods of making the separation intensities of spaced spots nonuniform, as set forth in Japanese Patent Preliminary Publication No. Sho 61-501798 and Japanese Patent Publication No. Sho 58-8483 (which corresponds to U.S. Pat. No. 4,575,193), are that in order to make the separation between spots vary with colors, namely wavelengths, the low-pass characteristic is changed in accordance with each color.

When the number of birefringent plates constituting the filter is represented by N, the number of spaced spots m is expressed by $$m = 2^N \quad (1)$$

Specifically, as the number of birefringent plates is increased, the number of spaced spots increases, and the frequency of occurrence of the superposition and approach of the spaced spots becomes high. In this case, the separation intensities of spaced spots may differ with the relationship between the superposition and the phase difference of light waves at the spaced spots, and also with wavelengths (colors). Consequently, the required filter characteristics are not obtained, with the failure of moire elimination.

The above prior art, however, does not in any way discuss the relationship between the superposition and the phase difference of light waves and the wavelength dependence where a plurality of quartz filters are constructed so that the orientations of their crystal axes are shifted, 45° for each. Thus, even though the optical low-pass filter is fabricated based on the design value, the fact will remain unnoticed that the required filter characteristics are not obtained due to the superposition and approach of the spaced spots caused by the increase of the number of spaced spots. As such, whenever trouble is produced, the filter has been discussed and redesigned.

In particular, where the TV camera using the solid-state image sensor is mounted to the fiberscope of the endoscope, moire is liable to occur because of an orderly array of fibers, and many quartz filters are required compared with common TV cameras used in the fields other than the endoscope. In this case, the larger the number of quartz filters, the higher the frequency of occurrence of the superposition and interference of the spaced spots. It has thus been difficult to derive the required filter characteristics. Consequently, moire elimination is so incomplete that the endoscope picture develops moire, and there is the fear of overlooking affected parts to cause an erroneous diagnosis.

SUMMARY OF THE INVENTION

It is, therefore, an object of the present invention to provide an imaging device in which even where many quartz filters are used, the separation intensities of spaced spots are made uniform, without wavelength dependence, and a good visual field of observation is obtained.

The imaging device according to the present invention has an optical low-pass filter and a solid-state image sensor. The low-pass filter includes a plurality of birefringent plates. Where a plurality of spaced spots formed by means of the birefringent plates with respect to incident light is located at adjacent positions such as to be regarded as one spot on the birefringent plates, the birefringent plates are constructed so that a phase difference between light waves passing through the plurality of spaced spots with respect to any wavelength in the visible wavelength region is larger than the wavelength considered.

According to another aspect of the present invention, where a plurality of spaced spots formed by means of the birefringent plates with respect to incident light are located at adjacent positions such as to be regarded as one spot on the birefringent plates, and are further separated by at least one birefringent plate, the birefringent plates being constructed so that a phase difference between light waves passing through the plurality of spaced spots with respect to any wavelength in the visible wavelength region is larger than the wavelength considered.

According to still another aspect of the present invention, where a plurality of spaced spots formed by means of one of the birefringent plates with respect to incident light is located at adjacent positions such as to be regarded as one spot on the birefringent plate, the orientations of crystal axes of the birefringent plates are selected so that a phase difference between light waves passing through the plurality of spaced spots with respect to any wavelength in the visible wavelength region is made larger than the wavelength considered by changing the orientations of crystal axes of the birefringent plates without changing a geometrical pattern of the spaced spots.

In order to obtain the low-pass characteristics based on the design value by the quartz filters, it is required that the spaced spots caused by the quartz filters are identical in pattern and intensity. It is also required that the pattern and separation intensities of the spaced spots are nearly equivalent and undergo little change with respect to any wavelength in the visible wavelength region, that is, to colors such as red, green, and blue. In general, the visible wavelength region extends from the lower limit value of 360–400 nm to the upper limit of 760–830 nm. In the case where the solid-state image sensor is used in the imaging device, wavelengths in the infrared wavelength region are removed by an infrared cutoff filter, so that it is only necessary to consider a maximum wavelength of 750 nm as the upper limit value of light incident on the quartz filter.

The phase difference is attributed to the fact that since two light wave components with different directions of vibrations traveling in a medium are different in refractive indices, the difference of traveling velocity arises between them. In an optical low-pass filter using N quartz filters, when the thickness of the i-th quartz filter from the incidence side of light is denoted by $t_i$, a phase difference $\rho_i$ caused is this optical low-pass filter is expressed by $$\rho_i = t_i \times (n_e - n_o) \quad (2)$$

where $n_o$ is the refractive index of an ordinary ray and $n_e$ is the refractive index of an extraordinary ray. Since P i is expressed as a phase difference between an ordinary ray and an extraordinary ray as see from Eq.(2), it can be considered that the extraordinary ray is given the phase difference P i by the quartz filter while the ordinary ray is given a phase difference of 0, upon taking a phase of the ordinary ray as a reference.

If the configuration of the N quartz filters (thicknesses, orientations of crystal axes, order of arrangement, etc.) is determined, ray tracing can be made as to how the spots are separated by the quartz filters or whether the spaced spots are derived from ordinary rays or extraordinary rays. The number of spaced spots formed by the N quartz filters is $2^N$, and if a spaced spot j is chosen out of the 2N spaced spots, whether it has emerged from the i-th quartz filter as ordinary rays or as extraordinary rays can be traced. The phase differences produced by the quartz filters and their sum can thus be calculated.

Hence, when a phase difference caused by each quartz filter is represented by $\rho_{ij}$, a total phase difference $\rho_{Tj}$ with respect to the spaced spot j quartz is given by $$\rho_{Tj} = \sum_{i=1}^{N} \rho_{ij} \quad (3)$$

In this case, however. If ordinary rays emerge from the L-th quartz filter, $\rho_{Lj}=0$ (i=1, 2, ... L, ... N).

The total phase difference $\rho_{Tj}$ is defined as the phase of the spaced spot j. When a spaced spot k adjacent to the spaced spot j is situated on the same surface, a phase difference $\Delta_{jk}$ between two these spots is expressed by $$\Delta_{jk} = |\rho_{Tj} - \rho_{Tk}| \quad (4)$$

The phase difference $\Delta_{jk}$ in the visible wavelegth region is required to have the maximum value satisfy to satisfying the following condition with respect to all the spaced spots adjacent to one another:

$$\Delta_{jk} > 5 \lambda \quad (5)$$

where $\lambda$ is an arbitrary wavelength in the visible wavelength region.

Although it is desirable that the condition defined by Eq. (5) is satisfied in theory, the required low-pass characteristics can be derived in practice, if the following condition is fulfilled:

$$\Delta_{jk} > 2 \lambda \quad (6)$$

If the phase difference $\Delta_{jk}$ between two spaced spots adjacent to each other satisfies the above condition, it will be averaged in the visible wavelength region since the phase difference varies greatly with wavelength. The low-pass characteristics free from dependence of wavelength (color) can thus be obtained. The phase difference $\Delta_{jk}$ is set slightly beyond the limit of the above condition, the low-pass characteristics will not undergo immediately a considerable change, but if the phase difference $\Delta_{jk}$ is below 1 $\lambda$, they will greatly be affected by the phase difference.

Since the phase difference caused by individual quartz filters varies with wavelength, it becomes great for a short wavelength in the same quartz filter, while for a longer wavelength, it becomes smaller. Hence, for the adjacent spaced spots, as mentioned above, the phase difference greatly changing over the whole of the visible region minimizes the influence produced by the adjacent spaced spots. As such, it is desirable that the maximum of the phase difference is at least 2 $\lambda$ on the short-wavelength side on which the phase difference is maximized.

In accordance with the attached drawings, reference is made to specific configurations and functions of the optical low-pass filter. FIG. 1A shows the configuration of an optical low-pass filter 1 comprising quartz filters 1a, 1b, 1c, and 1d. The quartz filters, as shown in FIG. 1B, are arranged so that their crystal axes are oriented to shift in 45° steps, and in the order from the object side, have thicknesses of 2.7, 2.33, 2.43, and 2.4 mm. In FIG. 2, although the phase difference varies with each pair of spaced spots, those of adjacent pairs of spaced spots denoted by symbols a, b, c, and d are equal to one another, and the distance between the spaced spots in each pair is 1.6 μm.

Here, a phase difference $\rho$ produced by each quartz filter, when the thickness of the quartz filter is represented by t (mm), is given by $$\rho = 0.25 t \times 10^3 / D \quad (7)$$

where D (μm) is the constant defined by the wavelength $\lambda$ of light and an angle $\phi$ made by the crystal axis of the quartz filter with the optical axis thereof. In this case, the angle $\phi=45°$ is taken as an example. This is because the thickness of the quartz filter for bringing about the same separation between the spots can be minimized. For the constant D, for example, D= 23.8 μm at a wavelength of 438 nm, D=26.6 μm at 483 nm, D=32.98 μm at 587 nm, and D=36.99 μm at 653 nm. The unit of the phase difference $\rho$ is assumed to be identical with that of the wavelength $\lambda$. Further, as mentioned above, only the extraordinary ray is provided with the phase difference $\rho$ and the phase difference for the ordinary ray is zero upon taking a phase of the ordinary ray as a reference.

At any angle except for 45°, the value of the constant D changes and that of the phase difference $\rho$ also changes accordingly. For instance, when the wavelength is 587 nm, D= 32.98 μm at the angle φ= 45°, whereas D=543.32 μm at the angle φ=10°. For information, the values of the constant D relative to other wavelengths and angles are given in Table 1.

TABLE 1

| Angle, | Wavelength, λ(nm) | | | |
|---|---|---|---|---|
| φ(°) | 438 | 483 | 587 | 653 |
| 10 | 396.56 | 449.82 | 543.32 | 612.97 |
| 15 | 175.82 | 196.33 | 243.22 | 272.70 |
| 20 | 100.39 | 112.16 | 139.03 | 155.92 |
| 25 | 65.67 | 73.38 | 90.98 | 102.03 |
| 30 | 46.89 | 52.39 | 64.96 | 72.85 |
| 60 | 15.55 | 17.38 | 21.55 | 24.18 |
| 70 | 13.20 | 14.75 | 18.29 | 20.51 |
| 80 | 12.00 | 13.41 | 16.64 | 18.66 |

Unit: μm

As seen from Table 1, the constant D increases with decreasing angle φ, and the phase difference ρ become small accordingly. Conversely, the constant D decreases with increasing angle φ, and the phase difference ρ become large accordingly. Further, whenever the angle φ is greater or less than 45°, the separation of rays per unit length will diminish. If, therefore, the same separation as in the case of the angle φ= 45° is required, each birefringent plate must be made thicker. For example, when the wavelength λ= 587 nm, the angle φ = 45°, and the thickness t=1 mm, a separation 1 is 5.882 μ and the phase difference ρ is 7.58. In order to obtain the same separation 1 at the angle φ=30°, the thickness t=1.158 mm is required. Since in this case the constant D=64.96 μm, the phase difference ρ= 4.46. Further, at the angle φ=60°, the thickness t= 1.151 mm, and therefore the phase difference ρ=13.35. Thus, even with the same separation pattern, the phase difference ρ can be changed. In a word, even in the same separation, the greater the angle φ, the larger the phase difference ρ. In order to increase the phase difference ρ, as will be described later, it is advisable to combine the angle φ=45° with the angle φ= 60° or the angle φ=30° with the angle φ= 60°. If, however, the angle φ is made smaller, the phase difference ρ may become too small, and thus care must be taken. Whether the angle φ is made smaller or larger, the birefringent plate increases in thickness compared with the case of the angle φ=45°. Hence, when the angle is altered, it is necessary to set the angle to such a level that no problem is caused by its size and weight.

If the difference in phase between the ordinary and extraordinary rays by each quartz filter is previously calculated from Eq. (7) and consideration is given as to how the pattern of the spaced spots is formed by each quartz filter, the total phase difference of the spaced spots can be calculated. In this case, as is seen from FIG. 3, the phase difference becomes nearly 0.5 λ over the entire visible region.

Where two overlapping light waves are considered as light passing through the quartz filters shown in FIGS. 1A and 1B and it is assumed that the two light waves are ordinary and extraordinary rays into which the light incident on the quartz filters is divided by birefringence, the directions or vibrations of the light waves make an angle of 90° with each other. In this case, if the phase difference is 0.5 λ, this combined wave can be thought of as linearly polarized light. Since the direction of vibration of the combined wave makes an angle of 90° with the orientation of the crystal axis of a subsequently disposed quartz filter, the spots are not separated but merely moved. If the value of the phase difference deviates from 0.5 λ, the polarization state of the combined wave will change into elliptical or circular polarization. If, therefore, the phase difference is small as shown in FIG. 3, the fluctuation of the phase difference, for example, in the visible region, will diminish. Thus, there is little change in the polarization state of the combined wave, and in view of the entire visible region, the polarization state of the combined wave is deviated, with the result that the separation intensities of the spaced spots become nonuniform. If the directions of vibrations of two light waves coincide with each other and the value of the phase difference is 0.5 λ, the two light waves will mutually compensate. This also affects the pattern of the spaced spots, together with those produced by subsequently disposed quartz filters.

When the phase difference is thus small in the visible region, the foregoing phenomena occur in regard to individual wavelengths. Consequently, the pattern of the spaced spots changes because of colors, such as red, green, and blue, and the spot intensities also change. If white light is made incident on a filter with such characteristics, the coloration of red and blue may be caused, depending on separated bright spots.

Here, the phase difference is calculated for the optical low-pass filter shown in FIGS. 4A and 4B. This filter includes the quartz filters 1a, 1b, and 1c which are the same as in FIGS. 1A and 1B, and a quartz filter d' in which the orientation of the crystal axis differs by 180° from that of the quartz filter 1d shown in FIGS. 1A and 1B. Thus, the geometrical pattern of the spaced spots is as shown in FIG. 2, and when the total phase difference of adjacent pairs of spaced spots denoted by symbols a, b, c, and d is calculated at every wavelength by the above method, the result is graphed as shown in FIG. 5. As evident from this graph, the phase difference in this case ranges from 30 λ to 50 λ over the entire visible region.

Even though the phase difference is increased, the separation intensities of the spaced spots will not be uniform because if the phase difference is constant in the entire visible region, the directions of vibrations of light waves will be deviated, except where the combined wave is circularly polarized light. If, however, the phase difference is increased, the fluctuation of the phase difference become great, and hence the above problem is obviated. In this case also, the phenomena stated above are considered to occur at a particular wavelength. However, since the phase differences at individual wavelengths are in a wide range of 30–50 λ and a light wave giving rise to the phenomena and another light wave exist with largely different phase differences, the phase differences are averaged in the visible region, and if the wavelength deviates slightly from the particular one, the phenomena will not be produced. Hence, for the colors of red, green, and blue, their equalization is made, so that the separation pattern and intensities of the spaced spots are not affected and If white light is incident on such a filter, the separated bright spots will not be colored. This is because it is considered that since light frequently changes into linearly polarized, elliptically polarized, and circularly polarized light, light waves with components of identical intensities in all the directions of vibrations are present in the entire visible region. The polarization state given in FIG. 5 schematically shows this description and does not completely coincide with the graph of the phase difference. The same may be said of the color bands of red, green, and blue. Also, the phase difference in the range of wavelengths of about 400–700 nm is rarely affected by colors if the amount of change of the wavelength is at least 2.5 λ.

In order to widely set the phase difference of adjacent spaced spots as mentioned above, it is necessary for the quartz filters to surely separate the light wave into two spots. In the case of the quartz filters of small thickness, however, both the separation and the phase difference between the spots diminish. As such, a moderate thickness is required, and the thickness required per filter Is nearly 0.8 mm or more. Each of the quartz filters shown in FIGS. 1A and 1B and FIGS. 4A and 4B has a thickness of 2 mm or more and a separation of 10 µm or more.

Here, the thickness of the quartz filter indicates the case where an angle made by the crystal axis of the quartz filter with a line perpendicular to its surface is 45°. In general, as illustrated in FIG. 6, when an angle made by the crystal axis of the quartz filter with the optical axis is represented by φ and the thickness of the quartz filter by t, a spot separation l caused by the quartz filter is expressed by $$l = \{(n_o^2 - n_e^2) \tan\phi / (n_o^2 + n_e^2 \tan^2\phi)\} \times t \quad (8)$$

where $n_o$ and $n_e$ are refractive indices relative to ordinary and extraordinary rays, respectively. For example, for the d line, when the refractive index $n_o$=1.54425, the refractive index $n_e$= 1.55336, the angle φ = 45°, and the thickness t= 1 mm, the separation l becomes 0. 005882 mm. For the value of the separation l, it is desirable that in view of the discussion which has been made so far, l> 0.0045.

If In general the quartz filters, each having a thickness of several millimeters, are arranged so that their crystal axes are oriented to shift, 45° for each, there is the fear that the low-pass characteristics based on the design value are not obtained where four or more quartz filters are used, and hence care should be taken. In particular, the fourth quartz filter is made liable to bring the spaced spots close to each other, and there is a high possibility that desired separation are not obtained at any quartz filter (fifth filters et seq.) subsequent to the fourth a filter.

Two adjacent spaced spots is defined as that two spots having such a space as can be substantially regarded as one spot on the image plane of the imaging device, where a spacing represented by the Rayleigh limit is given as a measure. Here, when an F number of the imaging optical system in the imaging device is denoted by $F_{NO}$ and a wavelength thereof by λ, a Rayleigh limit $r_o$ is expressed by $$r_o = 1.22 \times \lambda \times F_{NO} \quad (9)$$

The number of the spaced spots is not necessarily limited to two and a plurality of spaced spots may exist in the space given by Eq. (9). In this case, it is only necessary to extract all the adjacent spaced spots and calculate the phase differences of these spots to identify the possible small phase differences.

Since, however, the F number varies with the type of endoscope used even though the imaging optical system in the imaging device is identical, the value of the Rayleigh limit changes accordingly. Further, where the imaging optical system has a zoom lens, imaging magnification changes with zooming even though the same endoscope is used. The F number followed by the value of the Rayleigh limit also changes. Hence, there is the need of clarifying the conditions of the endoscope and imaging optical system used and calculating the value of the Rayleigh limit. The F number of the imaging device varies according to the combination with the endoscope, and for example, when the wavelength λ=587 nm, the Rayleigh limit ranges from 2 to 30 µm. In this case, the F number is assumed to be 2.8-42.

For the calculation, it is necessary to previously confirm the phase difference of the adjacent spots in a space within the range 2–3 times the Rayleigh limit. With the spacing of the Rayleigh limit, the intensity at the center hollow relative to the peak intensities of two spots becomes 74%, while it is said that even when the intensity is 80%, the two spots can be identified two-dimensionally. In fact, however, the spaced spots are affected not only by diffraction but by the aberration of the imaging optical system, and as such it is desirable that the spaced spots are selected with somewhat wide space.

This and other objects as well as the features and advantages of the present invention will become apparent from the following detailed description of the preferred embodiments when taken in conjunction with the accompanying drawings.

BRIEF DESCRIPTION OF THE DRAWINGS

FIG. 3 is a graph showing the relationship between the wavelength and the total phase difference of the spaced spots of the optical low-pass filter in FIGS. 1A and 1B;

FIGS. 4A and 4B are views showing the configuration of an optical low-pass filter used in a first embodiment of the imaging device according to the present invention and the orientations of crystal axes of birefringent plates thereof, respectively;

DETAILED DESCRIPTION OF THE PREFERRED EMBODIMENTS

Figure 1A:
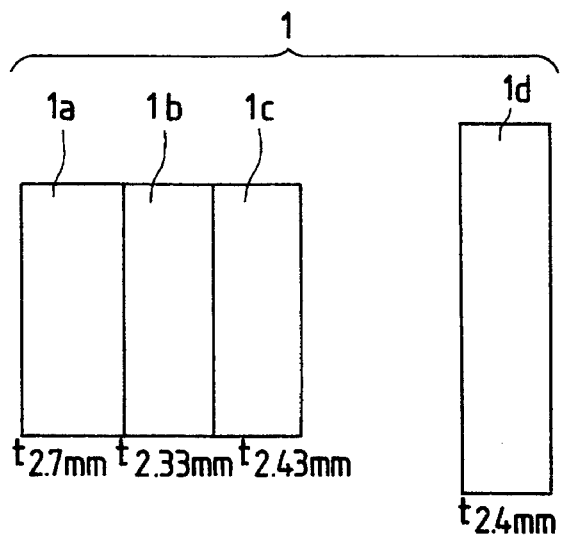
FIGS. 1A and 1B are views showing an example of the configuration of an optical low-pass filter composed of birefringent plates and the orientations of crystal axes of the birefringent plates, respectively.

Referring to the drawings, the embodiments of the present invention will be described in detail below.

First Embodiment

The configurations of the quartz filters shown in FIGS. 1A and 1B and FIGS. 4A and 4B show the first embodiment of the present invention. For the geometrical pattern of the spaced spots of the filters shown in FIG. 2, the phase differences of pairs of spaced spots designated by symbols a, b, c, and d are determined. In this diagram, in view of some spots close to the spots b, the distance between the spots b and another spot adjacent thereto on the right side is 5.5 μm and the other spots are situated farther away from the spots b.

Figure 7:
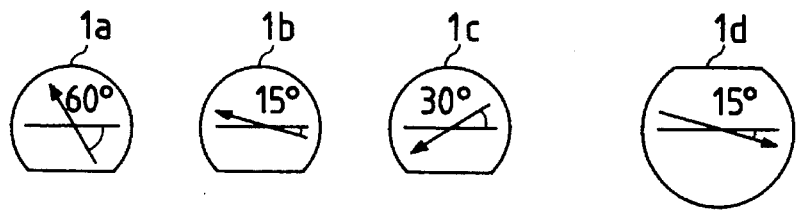
FIGS. 7 and 8 are views showing other examples of the orientations of crystal axes of the birefringent plates of the optical low-pass filter in the first embodiment.
Figure 8:
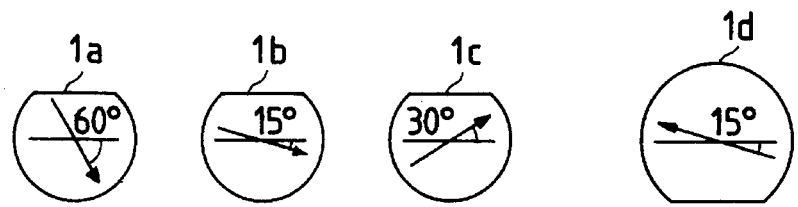
Figure 6:
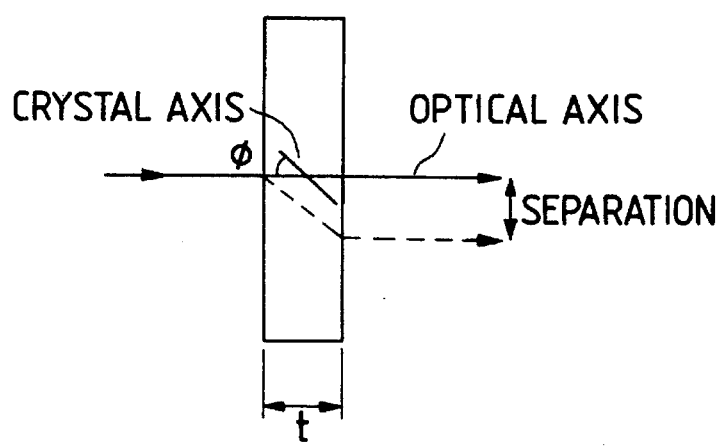
FIG. 6 is a view showing a crystal axis and an optical axis of a birefringent plate.

In the first embodiment, the specification of the imaging optical system is defined as the F number $F_{NO}= 5$ and the Rayleigh limit $r_o = 3.6$, and spots other than the respective pairs of spaced spots a, b, c, and d are not regarded as one spot. In this case, even though the value of the Rayleigh limit is increased, the phase differences of the spaced spots other than pairs of adjacent spots are 5 λ or more, and thus there is no problem. Although, in the configuration shown in FIGS. 4A and 4B, the quartz filter $1d'$ is used which is different in orientation of the crystal axis, the same effect is brought about whether the quartz filter $1d$ is rotated by 180° as shown in FIG. 7, or the quartz filters $1a$, $1b$, and $1c$ are arranged with a rotation of 180° as shown in FIG. 8. Further, the quartz filters may be separately provided or integrally cemented, and may also be scatteringly arranged in the imaging optical system.

Second Embodiment

Figure 9A:
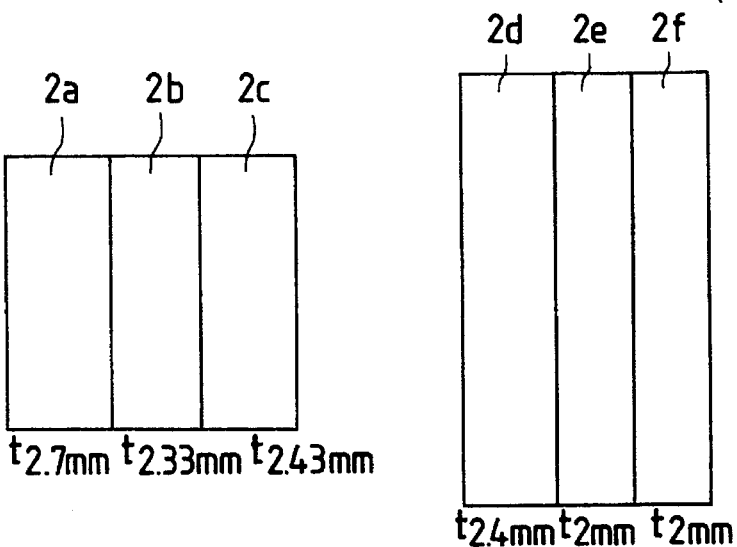
FIGS. 9A and 9B are views showing the configuration of an optical low-pass filter in a second embodiment of the present invention and the orientations of crystal axes of birefringent plates thereof, respectively.
Figure 9B:
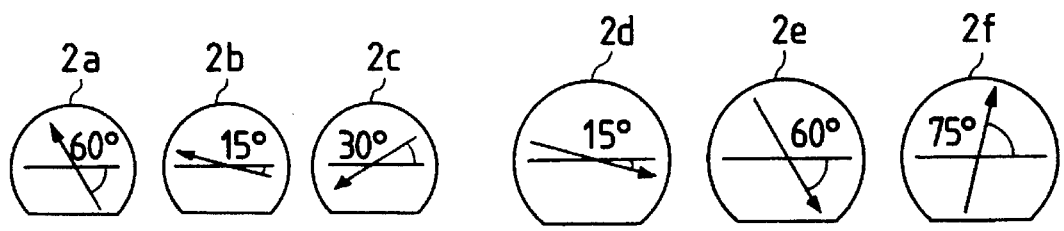

In FIG. 9A, an optical tow-pass filter 2 in the second embodiment comprises three quartz filters $2a$, $2b$, and $2c$ arranged in the front unit and other three quartz filters $2d$, $2e$, and $2f$ in the rear unit. The filters in the front unit have thicknesses of 2.7, 2.33, and 2.43 mm in the order from the object side and the filters in the rear unit have thicknesses of 2.4, 2.0, and 2.0 mm. FIG. 9B shows the orientations of crystal axes of these filter, where the quartz filters $2a$, $2b$, $2c$, and $2d$ are identical with those used in the first embodiment.

Figure 10:
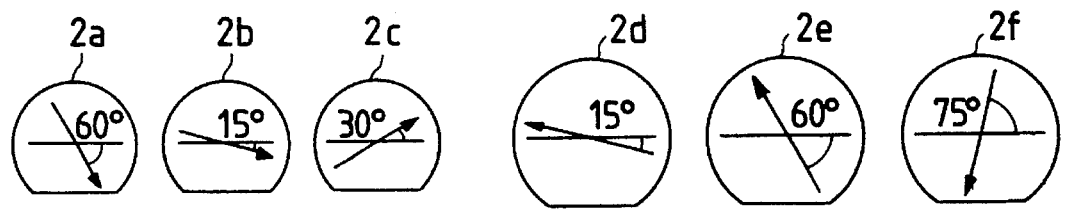
FIG. 10 is a view showing another example of the orientations of crystal axes of the birefringent plates of the optical low-pass filter in the second embodiment.

According to the second embodiment, the quartz filters are arranged with the orientations of the crystal axes shown in FIG. 9B, thereby increasing the phase difference of the adjacent spaced spots. In this case, however, if the crystal axes of the quartz filters in the rear unit are rotated 180°, the resultant phase difference will diminish as mentioned above and the desired separation of spots cannot be obtained. Also, even where all the crystal axes of the quartz filters in the front and rear units are rotated 180° as shown in FIG. 10, the same effect is secured.

Third Embodiment

Figure 11A:
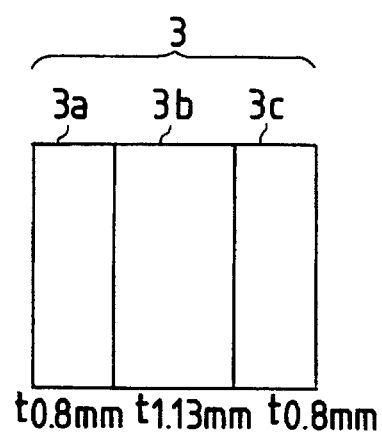
FIGS. 11A and 11B are views showing a configuration of an optical low-pass filter in a third embodiment of the present invention and the orientations of crystal axes of birefringent plates thereof, respectively.
Figure 11B:
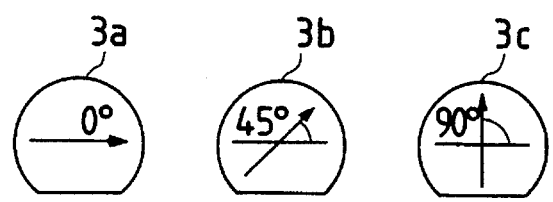
Figure 12:
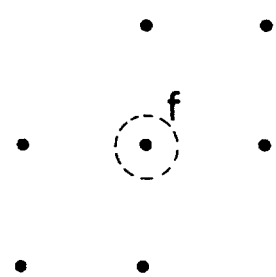
FIG. 12 is a view showing a pattern of spaced spots of the optical low-pass filter in the third embodiment.
Figure 13A:
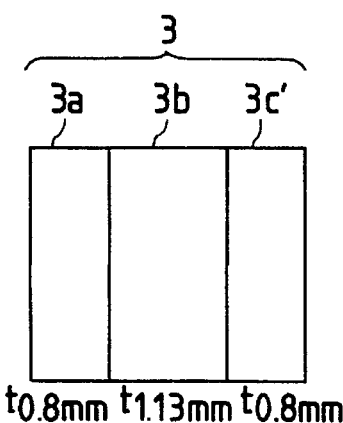
FIGS. 13A and 13B are views showing another configuration of the optical low-pass filter in the third embodiment and the orientations of crystal axes of the birefringent plates thereof, respectively.
Figure 13B:
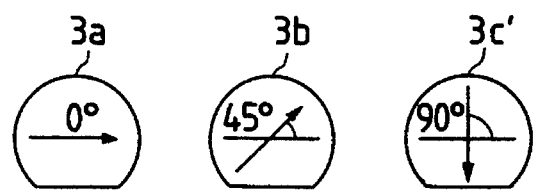

An optical low-pass filter 3 depicted in FIG. 11A is composed of three quartz filters $3a$, $3b$, and $3c$, which have thicknesses of 0.8, 1.13, and 0.8 mm, respectively. Thus, the ratio between the thicknesses of the filters is 1: $\sqrt{2}$: 1. The crystal axes, as shown in FIG. 11B, are oriented at 0°, 45°, and 90°, respectively FIG. 12 shows the pattern of spaced spots, where symbol f designates the superposition of two spots at the center. The optical low-pass filter shown in FIGS. 13A and 13B, instead of using the quartz filter $3c$, uses a quartz filter $3c'$ in which the orientation of the crystal axis differs by 180° therefrom. The pattern of the spaced spots is the same as In FIG. 12.

Where the filter shown in FIGS. 11A and 11B is evaluated for wavelength 438 nm, the phase difference Δ between the two spots f reduces to 4.9227. On the other hand, where the filter shown in FIGS. 13A and 13B is evaluated, the phase difference Δ increases to 11.8841 and a phase difference of 5 λ or more can be secured. The phase difference Δ at the d line (589.3 nm) becomes 3.5524 for FIGS. 11A and 11B and 8.5762 for FIGS. 13A and 13B.

Although the third embodiment is constructed so that the spots coincide, the same effect is secured even when the spots are slightly shifted. If each of the quartz filters is made thicker, the phase difference will increase, and hence it is not necessary to alter the orientations of crystal axes of the quartz filters.

The phase difference Δ with a value of 3.5524 as in FIGS. 11A and 11B may not cause problems in practical use, but it is desirable that for the design of the filter, the phase difference is nearly 5 times as large as wavelength, as mentioned above. If, therefore, the phase difference is designed to be below 5 times an arbitrary wavelength in the visible region, it is only necessary to increase the phase difference, for example, as in FIGS. 13A and 13B. When the phase difference of the adjacent spots reduces, it is undoubtedly important how the phase difference is increased without changing the pattern of the spaced spots of rays. If each of the birefringent plates is made thicker, the phase difference can take such a value as not to cause problems, irrespective of the configurations of the birefringent plates even though the adjacent spots exist. Thus, under these circumstances, the phase difference need not be considered. Also, this is not necessarily limited to the above case and holds for other cases.

Fourth Embodiment

Figure 14:
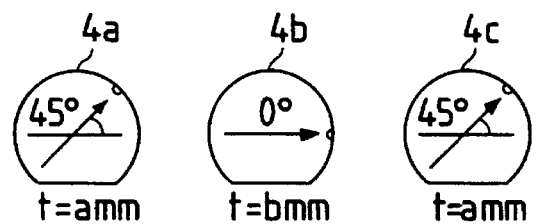
FIG. 14 is a view showing the orientations of crystal axes of birefringent plates constituting an optical low-pass filter in a fourth embodiment of the present invention.
Figure 15:
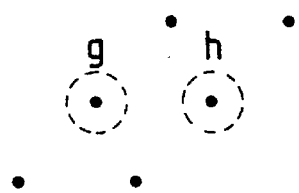
FIG. 15 is a view showing a pattern of spaced spots of the optical low-pass filter in FIG. 14.
Figure 16:
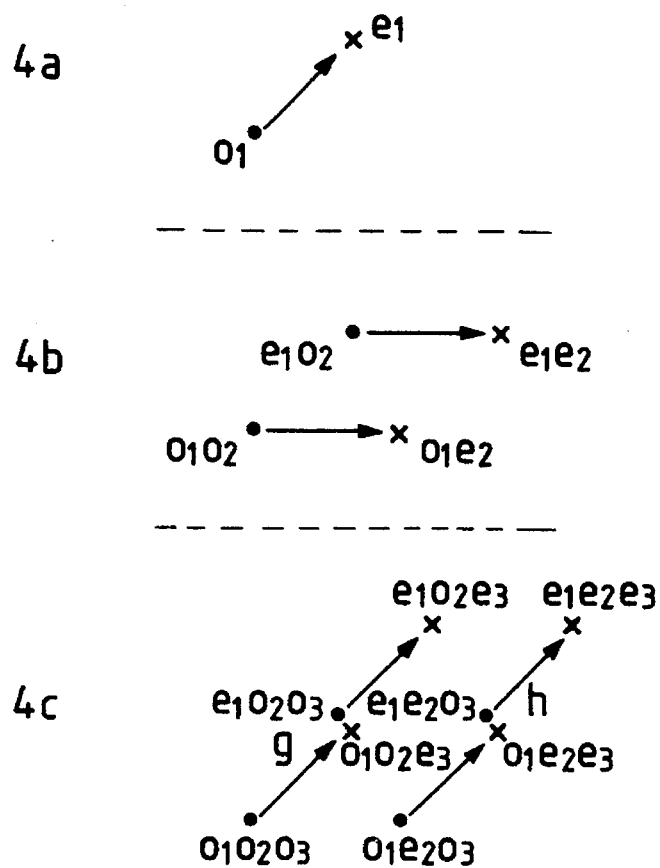
FIG. 16 is a view for explaining a state of the spaced spots of the optical low-pass filter in FIG. 15.

FIG. 14 shows three quartz filters $4a$, $4b$, and $4c$ arranged in the order from the object side. Their crystal axes are oriented at 45°, 0°, and 45° respectively The quartz filters $4a$ and $4c$ are of identical thicknesses. FIG. 15 depicts the pattern of the spaced spots, where symbols g and h each represents the superposition of two spots. In FIG. 16, symbol o denotes an ordinary ray, e denotes an extraordinary ray, and subscripts on o and e indicate which quartz filter the ray emerges from. The symbol g represents superposition of a spot ($e_1$ $o_2$ $o_3$) derived from the extraordinary ray through the first quartz filter and a spot ($o_1$ $o_2$ $e_3$) derived from the extraordinary ray through the third quartz filter, formed through separation and recombination of light. Similarly, the symbol h represents superposition of a spot ($e_1$ $e_2$ $o_3$) derived from the extraordinary ray through the first and second quartz filters and a spot ($o_1$ $e_2$ $e_3$) derived from the extraordinary ray through the second and third quartz filters.

As mentioned above, where the light wave emerging as the ordinary ray is regarded to be given a phase difference of zero, it is only necessary to consider the extraordinary ray only. Because the thicknesses of the first and third quartz filters are equal, the respective phase differences they give are also equal. Consequently, a phase difference between light waves emergent from each of the symbols g and h is zero, independent of wavelength. The ordinary and extraordinary rays are superimposed with a phase difference of zero, so that the light wave changes to linearly polarized light. If the fourth quartz filter is situated behind the quartz filter 4c, the spots cease to be separable because the direction of vibration of the light wave and the orientation of the crystal axis of the quartz filter become 90° or 0°.

Figure 17:
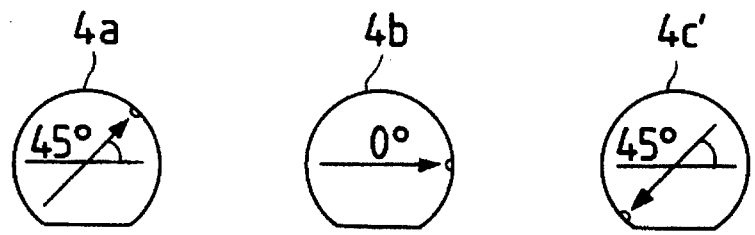
FIG. 17 is a view showing another example of the orientations of crystal axes of the birefringent plates in the fourth embodiment.

FIG. 17 shows the configuration in which, in place of the quartz filter 4c, a quartz filter 4c' is used which is different by 180° in orientation from the quartz filter 4c but equal in thickness thereto. Thus, the pattern of the spaced spots relative to FIG. 17 is the same as that given in FIG. 15.

Figure 18:
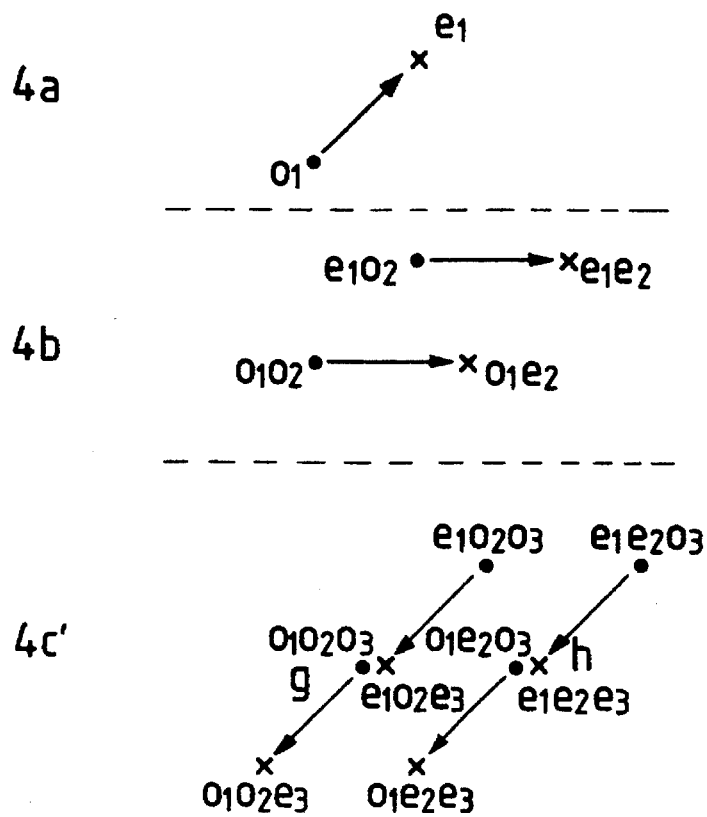
FIG. 18 is a view for explaining a state of the spaced spots of the optical low-pass filter in FIG. 17.

FIG. 18 shows a state of the spaced spots. In this case, for the symbol g, the light wave emerges as a spot ($o_1$ $o_2$ $o_3$) for all ordinary rays and a spot ($e_1$ $o_2$ $e_3$) for the extraordinary rays of the first and third quartz filters. In FIG. 16, the spots ($e_1$ $o_2$ $o_3$) and ($o_1$ $o_2$ $e_3$) are obtained, but in FIG. 17, the spots ($e_1$ $o_2$ $e_3$) and ($o_1$ $o_2$ $o_3$) are secured and their phase differences after passage through the second quartz filter relative to the ordinary ray become 0 and ρ1, respectively. Here, only the ray $e_1$ is provided with the phase difference ρ1. Next, the ray $e_3$ caused by the third quartz filter is assumed to be given a phase difference ρ3. That the orientation of the crystal axis of the third quartz filter is changed by 180° is nothing but that the phase ρ3 is provided to either of two rays. Specifically, after passage through the third quartz filter, the phase difference relative to the ordinary ray has two kinds of combinations, 0+ρ3 and ρ1+0; and 0+ 0 and ρ1+ρ3. The phase differences between light waves emergent from g caused by these combinations are |ρ1− ρ3| and |ρ1+ρ3| respectively. In the comparison between both combinations, the phase differences will differ by 2ρ3 and since the value of the phase ρ3 is large in general, the phase difference will greatly change by reversing the orientation of the crystal axis by 180°. Hence, the phase difference Δ in this case, although dependent on the thicknesses of the quartz filters, is 15.1607 at the d line, for example, if each of the filters 4a and 4c is of 1 mm thickness. Thus, even though the fourth quartz filter is provided, certain spaced spots are secured since the phase difference varies greatly with wavelength.

Figure 19:
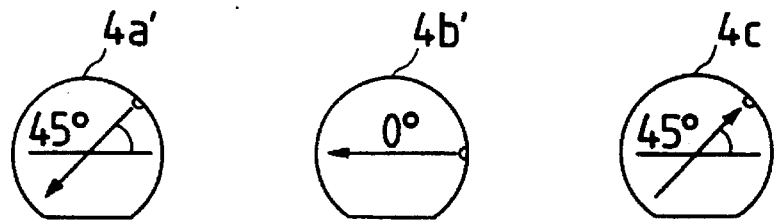
FIG. 19 is a view showing still another example of the orientations of crystal axes of the birefringent plates in the fourth embodiment.
Figure 20:
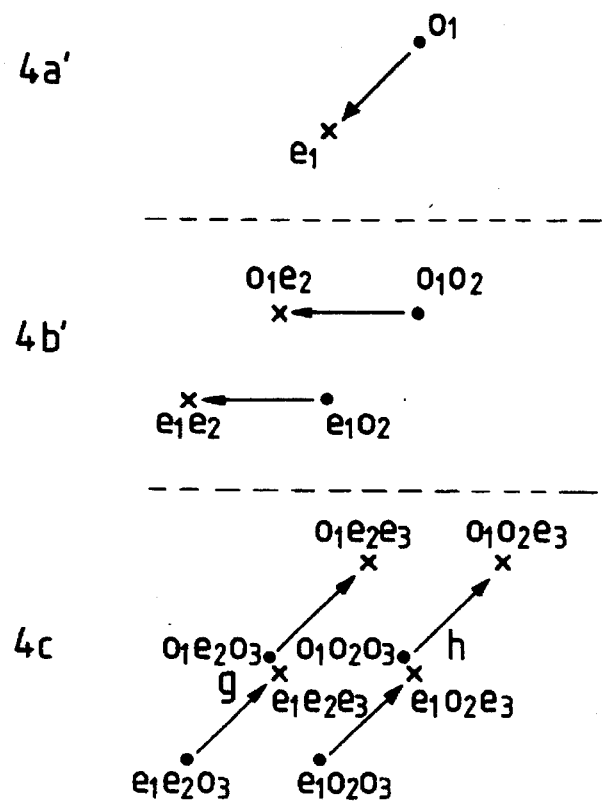
FIG. 20 is a view for explaining a state of the spaced spots of the optical low-pass filter in FIG. 19.

As shown in FIG. 19, the first and second quartz filters may well be replaced by quartz filters 4a' and 4b' which differ by 180° in orientation from them. A state of the spaced spots in this case is given in FIG. 20. Further, even when the crystal axes of the first and second quartz filters are rotated through 180° without changing the orientation of the crystal axis of the third quartz filter, the same effect is brought about.

Fifth Embodiment

Although it has been discussed so far that with the angle φ =45° as a typical example, the phase difference between the adjacent spaced spots is increased without changing the geometrical pattern of the spaced spots, the following configuration is also possible. Based on the first embodiment. The fifth embodiment will be explained below.

Figure 1B:
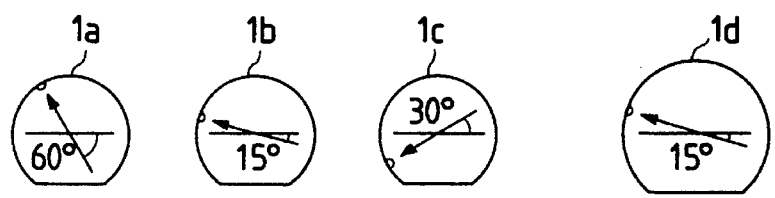
Figure 2:
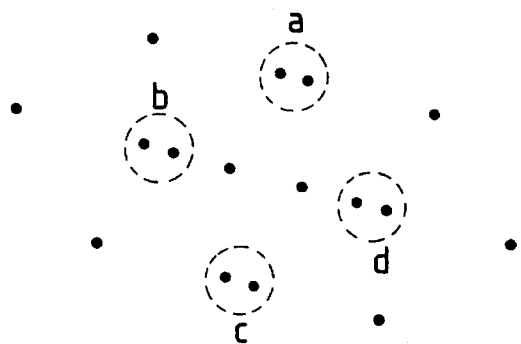
FIG. 2 is a view showing a geometrical pattern of spaced spots of the optical low-pass filter in FIGS. 1A and 1B.
Figure 4B:
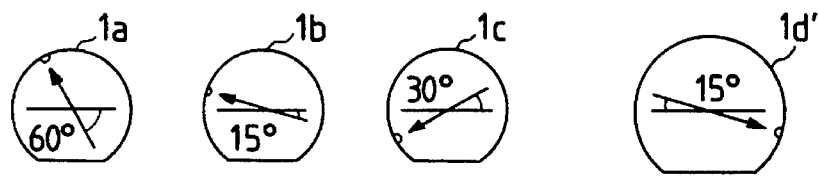
Figure 5:
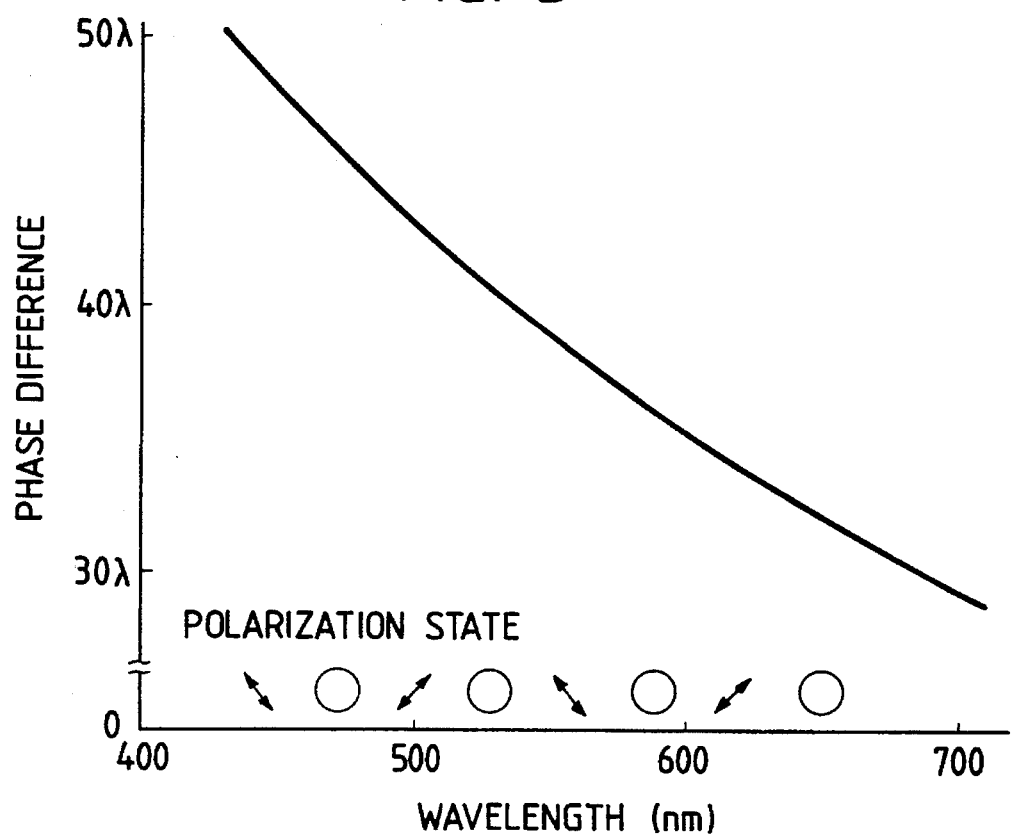
FIG. 5 is a graph showing the relationship between the wavelength and the total phase difference of the spaced spots of the optical low-pass filter in FIGS. 4A and 4B.

It has been previously described that with the configuration shown in FIGS. 1A and 1B, the phase difference Δ between the adjacent spaced spots in a circle designated by a, b, c or d is 0.5 λ. Here, in view of certain adjacent spaced spots, their components are ($o_1$ $e_2$ $o_3$ $o_4$) and ($o_1$ $o_2$ $o_3$ $e_4$). This phase difference between the components depends on the difference in phase between the rays $e_2$ and $e_4$, namely the difference between the phase differences ρ obtained by the second and fourth birefringent plates. Thus, attention has been paid to the fact that the phase difference ρ caused by a birefringent plate changes even when another birefringent plate providing the same ray separation by the angle φ made by a line normal to its surface with its crystal axis is used instead. The configurations of the second and fourth birefringent plates are changed considering the above fact. When the wavelength λ=587 nm and the angle φ = 60°, the constant D= 21.55 μm. It follows from this that each birefringent plate must be 1.158 times as thick as that at the angle φ = 45° in order to obtain the same ray separation.

Figure 21:
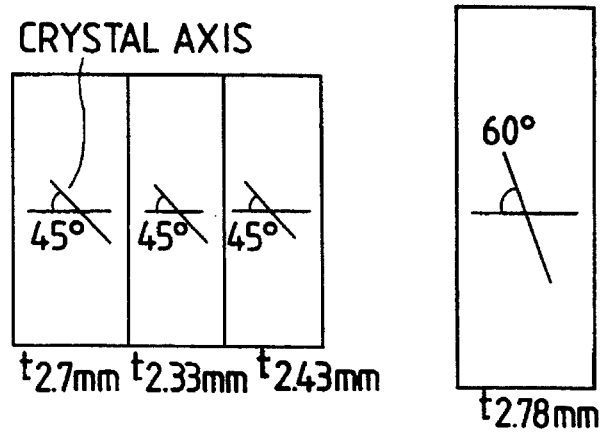
FIG. 21 is a view showing a configuration of an optical low-pass filter in a fifth embodiment of the present invention.

FIG. 21 shows birefringent plates in which the configuration of the fourth birefringent plate is changed and the others are identical with the configurations shown in FIGS. 1A and 1B. Since the angle φ=60° is set, the thickness of the birefringent plate is to be 2.78 mm. In this case, a phase difference ρ' by the fourth birefringent plate is 32.25. Since the angle φ= 45°, as the constant D= 32.98 μm and the thickness t= 2.33, the phase difference ρ by the second birefringent plate is 17.66. Therefore, the phase difference Δ between adjacent spots can be defined as Δ=|ρ−ρ'|= 4.59>> 0.5.

Figure 22:
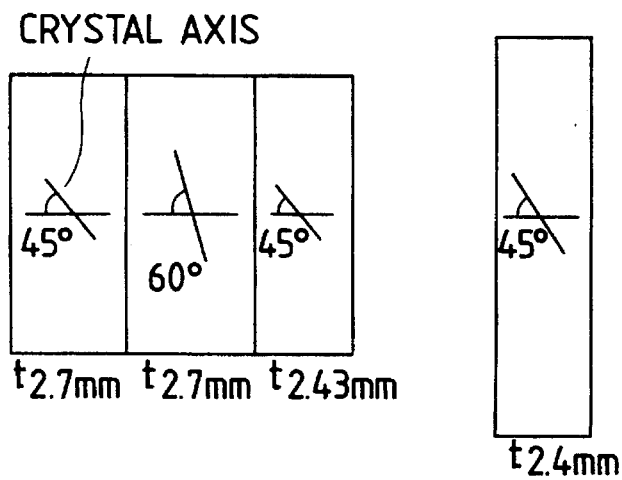
FIG. 22 is a view showing another configuration of the optical low-pass filter in the fifth embodiment.

FIG. 22 shows birefringent plates in which, by contrast, the configuration of the second birefringent plate is changed. Since only the second birefringent plate is configured as the angle φ= 60° and the thickness t= 2.7 mm, the difference ρ'=31.32 as caused thereby while the difference ρ= 18.19 as caused by the fourth birefringent plate. Hence, in this case, the phase difference Δ between adjacent spots can be defined as Δ=|ρ−ρ'|= 13.13>> 0.5. If the angles φ of the second and fourth birefringent plates are made identical, the values of the phases ρ and ρ' become nearly equal. As such, when both configurations are changed, it is essential that the values of the angles φ are varied. Since in this case the phase difference between the adjacent spots is determined by the second and fourth birefringent plates, they are configured, for example, as the angle φ=30° for the second and the angle φ= 60° for the fourth. In this way, when the angle φ< 45° for one birefringent plate, the phase difference caused thereby can be made smaller than that when the angle φ=45° . Such a combination is very advantageous.

As mentioned above, in order to highly increase the phase difference between the adjacent spaced spots without changing the geometrical pattern of a ray separation image, the orientations of the crystal axes are relatively shifted to alter the directions of the spaced spots, or the angles made by the optical axis with the crystal axes and the thicknesses of the quartz filters are varied, thereby allowing the desired low-pass characteristics to be attained. In this case, the possibility of practical use of the quartz filters in any way stated above is determined by confirming the phase difference between the adjacent spaced spots.

In the above embodiments, a single quartz filter may well be disposed, as the optical low-pass filter, immediately before a solid-state image sensor such as a CCD. Further, the quartz filters may also be integrally cemented or scatteringly arranged in the imaging optical system. The quartz filters may of course be combined with another optical low-pass filter. A choice of materials for the birefringent plates is not limited to the quartz filters. Also, it is desirable that the spaced spots caused by the quartz filters are formed not to overlap as far as possible.

In the case where the imaging optical system having the optical low-pass filter and the solid-state image sensor, such as a CCD, can be separated or connected mechanically and optically, it is needless to say that the quartz filters in a separation or connection state must be configured so that the phase difference between the spaced spots by the quartz filters becomes large.

Further, where the quartz filters are arranged in an imaging optical system with a zoom lens, the separation between the spots changes because magnification varies with zooming, and the resultant distance between the adjacent spaced spots changes. At the same time, the F number of a lens system changes and the range of the Rayleigh limit also changes. In this case, it is only necessary to satisfy the above conditions in each state of zooming.

Figure 23:
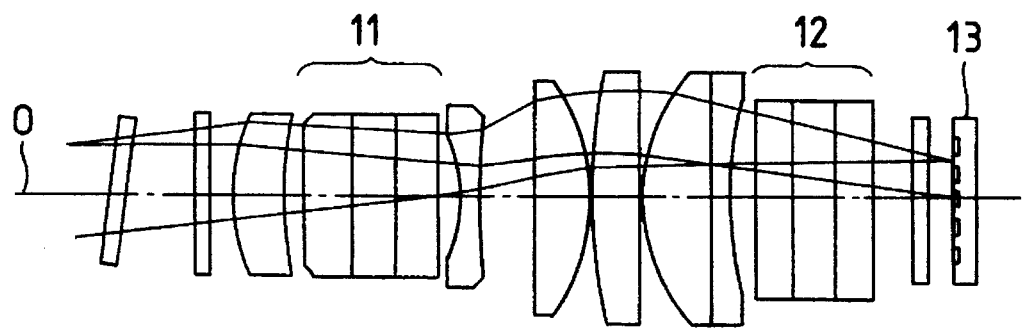
FIG. 23 is a view showing the configuration of the imaging device according to the present invention.

FIG. 23 depicts the arrangement of the imaging device according to the present invention. This imaging device is such that, for example, the optical low-pass filter of the second embodiment is disposed in the imaging optical system with a zoom lens. The optical low-pass filter is composed of quartz filters 11 in a front unit and quartz filters 12 in a rear unit. The front unit 11 is situated midway of the lens system and the rear unit 12 is disposed immediately before a solid-state image sensor 13.

Figure 24:
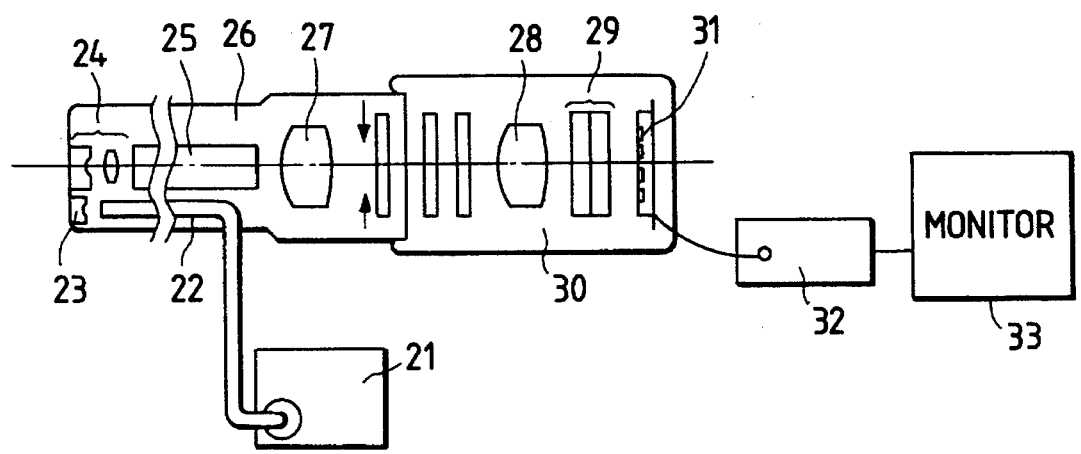
FIG. 24 is a view showing the arrangement where the imaging device according to the present invention is attached to an endoscope.

FIG. 24 shows the arrangement where the imaging device of the present invention is mounted to an endoscope. This arrangement is made so that illumination light emitted from a light source 21 disposed outside an endoscope 26 is radiated through a light guide 22 and an illumination lens 23 onto an object, light from the object is imaged by an objective lens 24 to form an image of the object, which is transmitted, by an image guide 25, through an eyepiece 27 and through an imaging optical system 28 and quartz filters 29 within an imaging device 30, onto a solid-state image sensor 31. The image transmitted on the solid-state image sensor 31 is signal-processed by a camera control unit 32 and displayed as a picture on a monitor 33.

What is claimed is:

1. An imaging device comprising:

an imaging optical system;

an optical low-pass filter including a plurality of first birefringent plates, thereby incident light being separated to be emergent from a plurality of spots on a last surface of said plurality of first birefringent plates from an entrance side; and a solid-state image sensor;

said plurality of spots including spots located adjacent to one another with a distance therebetween being approximately equal to or less than three times a Rayleigh limit determined dependent on an F number of said imaging optical system; and said plurality of first birefringent plates being constructed so that a phase difference between light waves respectively emergent from said spots located adjacent to one another is larger than a wavelength of said light waves in a visible wavelength region.

2. An imaging device according to claim 1, further comprising:

a second birefringent plate for further separating light emergent from said spots located adjacent to one another.

3. An imaging device according to claim 1, wherein:

said imaging optical system includes a zoom system; and said birefringent plates are constructed so that a phase difference between light waves emergent respectfully from said spots located adjacent to one another is always larger than a wavelength of said light waves in a visible wavelength region regardless of a zooming operation by said zoom system.

4. An imaging device according to claim 1, wherein:

said plurality of birefringent plates are constructed so that a phase difference between light waves respectively emergent from said spots located adjacent to one another is larger than a wavelength of said light waves in a visible wavelength region by arranging respective angles made by a line perpendicular to a surface of respective ones of only some of said birefringent plates with crystal axes of said respective ones of only some of said birefringent plates deviate in increments of 45° and do not change a geometrical pattern of said plurality of spots on said last surface of said plurality of birefringent plates.

5. An imaging device comprising:

an imaging optical system;

an optical low-pass filter including a plurality of birefringent plates, thereby incident light being separated to be emergent from a plurality of spots on a last surface of said plurality of birefringent plates from an entrance side; and a solid-state image sensor;

said plurality of spots formed by at least a second one of said plurality of birefringent plates from an entrance side of said birefringent plates on an exit surface of said at least said second one of said plurality of birefringent plates with respect to said incident light including spots located adjacent to one another with a distance therebetween being approximately equal to or less than three times a Rayleigh limit determined dependent on an F number of said imaging optical system; and said plurality of birefringent plates being constructed so that a phase difference between light waves emergent respectfully from said spots located adjacent to one another is larger than a wavelength of said light waves in a visible wavelength region, with orientations of crystal axes of said plurality of birefringent plates selected so as not to change a geometrical pattern of said plurality of spots on said exit surface of said at least said second one of said plurality of birefringent plates.

6. An imaging device comprising:

an imaging optical system;

an optical low-pass filter including a plurality of birefringent plates, thereby incident light being separated to be emergent from a plurality of spots on a last surface of said plurality of birefringent plates from an entrance side; and a solid-state image sensor;

said plurality of spots formed by at least a second one of said plurality of birefringent plates from an entrance side of said plurality of birefringent plates on an exit surface of said at least said second one of said plurality of birefringent plates with respect to said incident light including spots located adjacent to one another with a distance therebetween being approximately equal to or less than three times a Rayleigh limit determined dependent on an F number of said imaging optical system; and said plurality of birefringent plates being constructed so that a phase difference between light waves emergent respectfully from said spots located adjacent to one another is larger than a wavelength of said light waves in a visible wavelength region, by changing a relative relationship between an orientation of a crystal axis of said at least said second one of said plurality of birefringent plates and an orientation of a crystal axis of each of said plurality of birefringent plates disposed before said at least said second one of said plurality of birefringent plates by an angle of 180° without changing a geometrical pattern of said plurality of spots on said exit surface of said at least said second one of said plurality of birefringent plates.

7. An imaging device according to claim 1, 2, 3, 4, 5 or 6, wherein said crystal axes of each of said birefringent plates are arranged to be rotated by 45° relative to respective crystal axes of adjacent ones of said plurality of birefringent plates.

8. An imaging device according to claim 1, 2, 3, 4, 5 or 6, wherein said crystal axes of less than all of said plurality of birefringent plates are rotated by 45° relative to respective crystal axes of adjacent ones of said plurality of birefringent plates.

9. An imaging device according to claim 1, 2, 3, 4, 5 or 6, wherein:

said plurality of spots formed by an at least P-th one of said plurality of birefringent plates from an entrance side thereof, where P is an integer and equal to or greater than 3, on an exit surface of said at last P-th one of said plurality of birefringent plates with respect to said incident light include spots located adjacent to one another with a distance therebetween being approximately equal to or less than three times a Rayleigh limit determined dependent on an F number of said imaging optical system; and a number of said plurality of birefringent plates is at least p+ 1.

10. An imaging deice according to claim 1, 2, 3, 4, 5 or 6, wherein each of said plurality of birefringent plates satisfy a condition:

$$\{(n_o^2-n_e^2)\tan \phi/(n_o^2+ n_e^2 \tan^2\phi)\} \times t > 0.0045 \text{ (mm)}$$

where $n_o$ and $n_e$ are refractive indices relative to ordinary and extraordinary rays, respectively, $\phi$ is an angle made by a line perpendicular to a surface of each respective one of said plurality of birefringent plates with a crystal axis of said respective one of said plurality of birefringent plates, and t is a thickness of said respective one of said plurality of birefringent plates.

11. An imaging device according to claim 1, 2, 3, 4, 5 or 6, wherein a maximum value of a phase difference between light waves emergent respectively from said spots located adjacent to one another is at least 5 λ in a visible wavelength region.

12. An imaging device according to claim 1, 2, 3, 4, 5 or 6, wherein a variation of values of a phase difference between light waves emergent respectively from said spots located adjacent to one another is at least 2.5 λ in a visible wavelength region.

13. An imaging device according to claim 1, 2, 3, 4, 5 or 6, wherein a number of said plurality of birefringent plates is represented by N, a number of spots formed on an exit surface of an N-th one of said plurality of birefringent plates from an entrance side of said imaging device with respect to said incident light is $2^N$, wherein a combined spot as well as spots adjacent to one another are regarded as plural ones of said plurality of spots and adjacent ones of said plurality of birefringent plates whose crystal axes are parallel to one another are regarded as a single one of said plurality of birefringent plates.

14. An imaging device according to claim 1, 2, 3, 4, 5 or 6, wherein an angle made by a line perpendicular to a surface of each of said plurality of birefringent plates with a crystal axis of each of said plurality of birefringent plates is 45°.

15. An imaging device according to claim 1, 2, 3, 4, 5 or 6, wherein:

said plurality of birefringent plates are constructed so that a phase difference between light waves emergent respectively from said spots located adjacent to one another is larger than 5 times a wavelength of said light waves in a visible wavelength region, wherein an angle made by a line perpendicular to a surface of each of said plurality of birefringent plates with a crystal axis of each of said plurality of birefringent plates is 45° without changing a geometrical pattern of said plurality of spots formed on a last surface of said plurality of birefringent plates from an entrance side thereof with respect to said incident light.

* * * * *